(12) United States Patent
Lin et al.

(10) Patent No.: US 8,717,000 B2
(45) Date of Patent: May 6, 2014

(54) VOLTAGE REGULATING APPARATUS WITH SWITCHING AND LINEAR OPERATIONAL MODES

(75) Inventors: Chih-Pao Lin, Hsinchu County (TW); Jui-Tse Lin, Hsinchu County (TW); Tsung-Yen Tsai, Hsinchu County (TW)

(73) Assignee: Realtek Semiconductor Corp., Hsinchu (TW)

( * ) Notice: Subject to any disclaimer, the term of this patent is extended or adjusted under 35 U.S.C. 154(b) by 251 days.

(21) Appl. No.: 13/293,681

(22) Filed: Nov. 10, 2011

(65) Prior Publication Data

US 2012/0223686 A1    Sep. 6, 2012

(30) Foreign Application Priority Data

Mar. 4, 2011 (TW) ............................. 100107441 A

(51) Int. Cl.
*G05F 1/00* (2006.01)

(52) U.S. Cl.
USPC .......................................... 323/284; 323/285

(58) Field of Classification Search
USPC ......... 323/222, 223, 224, 225, 226, 271, 273, 323/282, 283, 284, 285
See application file for complete search history.

(56) References Cited

U.S. PATENT DOCUMENTS

| 7,064,531 | B1 | 6/2006 | Zinn | |
|---|---|---|---|---|
| 7,443,147 | B2 * | 10/2008 | Kasai et al. | 323/259 |
| 2007/0069703 | A1 * | 3/2007 | Kokubun et al. | 323/282 |
| 2009/0153122 | A1 * | 6/2009 | Kawagishi et al. | 323/284 |

FOREIGN PATENT DOCUMENTS

TW        200713770        4/2007

OTHER PUBLICATIONS

Intellectual Property Office, Ministry of Economic Affairs, R.O.C., "Office Action", Jul. 31, 2013, Taiwan.

* cited by examiner

*Primary Examiner* — Nguyen Tran
(74) *Attorney, Agent, or Firm* — Morris Manning & Martin LLP; Tim Tingkang Xia, Esq.

(57) ABSTRACT

The invention discloses a voltage regulating apparatus which includes: an output stage providing the apparatus with an output voltage and producing a partial voltage of the output voltage; an error amplifier coupled to the output stage and comparing the partial voltage with a reference to produce a first voltage; a PWM unit coupled to the error amplifier and comparing the first voltage with a voltage signal to produce second and third voltages; a selection unit coupled to the error amplifier and the PWM unit and outputting a fourth voltage equalling either the first or the second voltage; a first transistor coupled to the selection unit and receiving the fourth voltage and a DC voltage; and a second transistor coupled to the PWM unit, the first transistor, and a ground and receiving the third voltage; wherein a connection point of the first and second transistors is connected to the output stage.

19 Claims, 5 Drawing Sheets

VOLTAGE REGULATING APPARATUS WITH SWITCHING AND LINEAR OPERATIONAL MODES

CROSS-REFERENCE TO RELATED APPLICATIONS

This non-provisional application claims priority under 35 U.S.C. §119(a) on Patent Application No. 100107441 filed in Taiwan (R.O.C.) on Mar. 4, 2011, the entire contents of which are hereby incorporated by reference.

TECHNICAL FIELD

The present disclosure relates to a voltage regulating apparatus, and more particularly, to a voltage regulating apparatus which can operate either in a linear mode or in a switching mode.

TECHNICAL BACKGROUND

Voltage regulators are used to automatically regulate an irregular voltage to a DC voltage of constant level. Generally, the voltage regulators can be classified into two operational modes: linear and switching modes. A voltage regulator of linear mode usually provides a less output current, which is applicable to the usage of light load or no load, preferably to the light load. Instead, a voltage regulator of switching mode usually provides a larger output current, which is applicable to the usage of heavy load.

Recently, voltage regulators operable in both linear and switching operational modes have been developed in order to lower the fabrication cost in consideration of mess-production. An individual integrated-circuit (IC) chip of voltage regulator with both modes may be applicable to various user requirements. However, more electrical components would be included in the circuit layout of such a voltage regulator. The number of components needs to be decreased to lower the cost without degrading its operational performance.

TECHNICAL SUMMARY

According to one aspect of the present disclosure, a first embodiment provides a voltage regulating apparatus which can operate either in a linear mode or in a switching mode, the voltage regulating apparatus comprising: an output stage providing the voltage regulating apparatus with an output voltage and producing a partial voltage which is a fraction of the output voltage; an error amplifier coupled to the output stage and comparing the partial voltage with a reference voltage to produce a first voltage; a PWM (Pulse Width Modulation) unit coupled to the error amplifier and comparing the first voltage with a voltage signal to produce a second voltage and a third voltage; a selection unit coupled to the error amplifier and the PWM unit and outputting a fourth voltage which is equal to either the first voltage or the second voltage; a first power transistor coupled to the selection unit and receiving the fourth voltage and a DC voltage; and a second power transistor coupled to the PWM unit, the first power transistor, and a ground and receiving the third voltage; wherein a connection point of the first and second power transistors is connected to the output stage.

According to another aspect of the present disclosure, a second embodiment provides a voltage regulating apparatus, which can operate either in a linear mode or in a switching mode, the voltage regulating apparatus comprising: an output stage providing the voltage regulating apparatus with an output voltage and producing a partial voltage which is a fraction of the output voltage; a first error amplifier coupled to the output stage and comparing the partial voltage with a first reference voltage to produce a first voltage; a second error amplifier coupled to the output stage and comparing the partial voltage with a second reference voltage to produce a second voltage; a PWM unit coupled to the second error amplifier and comparing the second voltage with a voltage signal to produce a third voltage and a fourth voltage; a selection unit coupled to the first error amplifier and the PWM unit and outputting a fifth voltage which is equal to either the first voltage or the third voltage; a first power transistor coupled to the selection unit and receiving the fifth voltage and a DC voltage; and a second power transistor coupled to the PWM unit, the first power transistor, and a ground and receiving the fourth voltage; wherein a connection point of the first and second power transistors is connected to the output stage.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DESCRIPTION OF THE EXEMPLARY EMBODIMENTS

For further understanding and recognizing the fulfilled functions and structural characteristics of the disclosure, several exemplary embodiments cooperating with detailed description are presented as the following.

Figure 1:
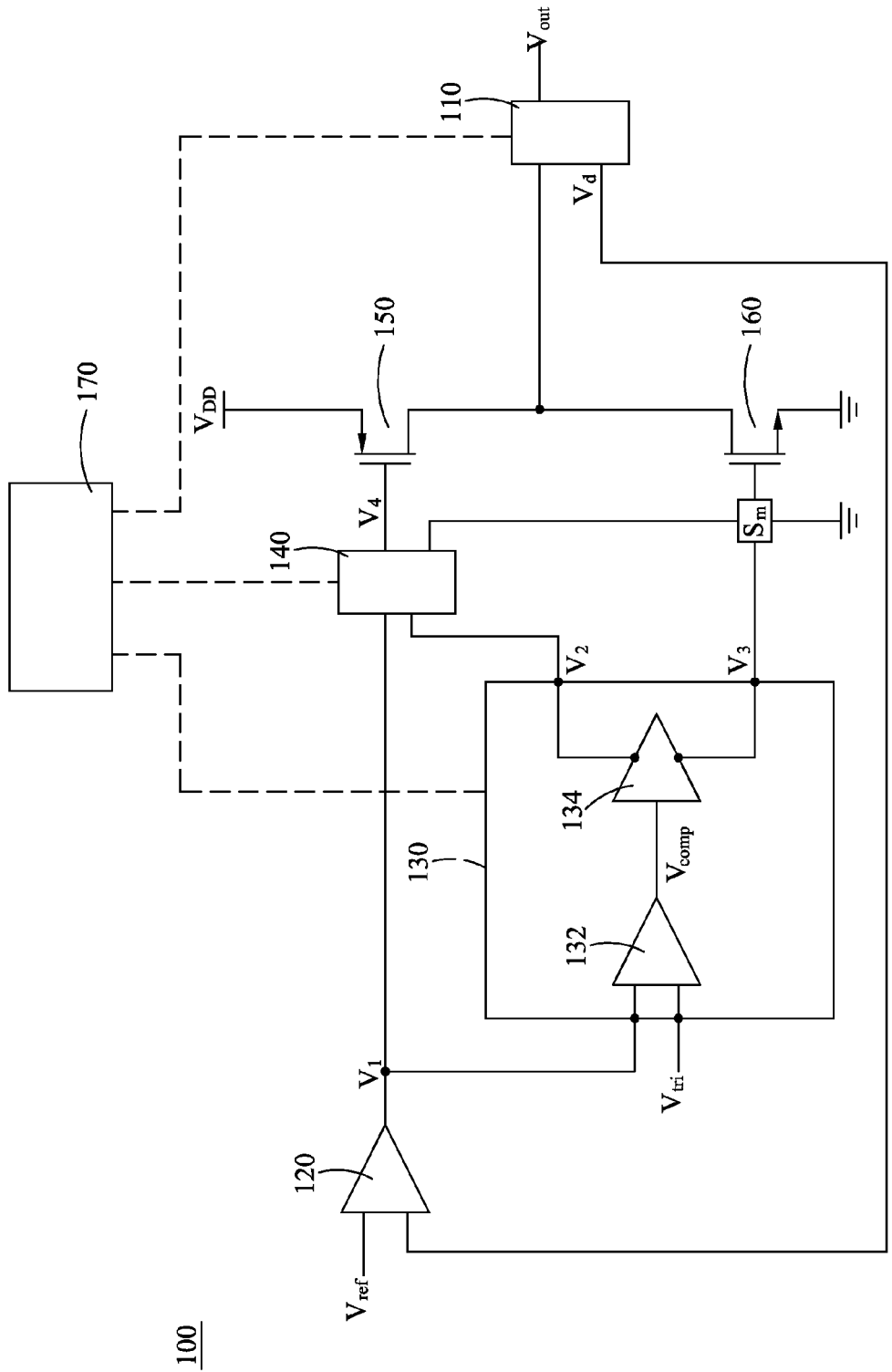
FIG. 1 is a circuit diagram illustrating a voltage regulating apparatus according to a first embodiment of the present invention.

FIG. 1 shows a circuit diagram illustrating a voltage regulating apparatus according to a first embodiment of the present invention. The voltage regulating apparatus 100, which can operate either in a linear mode or in a switching mode in accordance with a predetermined condition or a practical necessity, includes an output stage 110, an error amplifier 120, a PWM unit 130, a selection unit 140, and at least two power transistors 150 and 160. Wherein, the voltage regulating apparatus 100 in the linear mode of operation shares the output stage and the power transistors with itself in the switching mode, so as to be applicable to various user needs.

The output stage 110 can be configured to provide the voltage regulating apparatus 100 with an output voltage $V_{out}$ of regulation. Also, the output stage 110 can produce a partial voltage which is a fraction of the output voltage $V_{out}$. In the embodiment, the output stage 110 is composed of a voltage divider and a low-pass filter. The voltage divider includes a plurality of resistances in series connection. A partial voltage $V_d$ is formed by a resistive voltage division of the output voltage $V_{out}$, so as to be provided to the error amplifier 120 as the input voltage thereof, either in the linear or switching mode of the voltage regulating apparatus 100. The low-pass filter includes a capacitor or an inductor. If the voltage regulating apparatus 100 is put in the linear mode of operation, the low-pass filter can be composed of a first capacitor; while if the voltage regulating apparatus 100 is put in the switching mode of operation, the low-pass filter can be composed of a second capacitor and an inductor. According to the embodiment, the capacitor(s) and/or inductor(s) of the low-pass filters are not integrated into an integrated-circuit (IC) chip of the voltage regulating apparatus 100 itself; instead, the capacitor(s) and/or inductor(s) are discrete devices and chosen and bonded to an IC chip based on the circuit design and specification. But the present invention is not limited thereby; for example, the low-pass filter can also be composed of a first filter including a first capacitor and a second filter including a second capacitor and an inductor, and the foregoing low-pass filter can be integrated into the IC chip of the voltage regulating apparatus 100. The first or second filter can then be selected to output a predetermined voltage in accordance with the operational mode of the voltage regulating apparatus 100.

In the embodiment, the error amplifier 120 is shared in the voltage regulating apparatus 100 of both the linear and switching modes. The error amplifier 120 is coupled to the output stage 110 to receive the partial voltage $V_d$. Therein, the partial voltage $V_d$ is compared with a reference voltage $V_{ref}$ to produce an error signal, and it is amplified and then outputted as a first voltage $V_1$. Whereby, the voltage regulating apparatus 100 can operate in the linear mode. On the other hand, the PWM unit 130 works in the voltage regulating apparatus 100 only under the switching mode of operation. The PWM unit 130 in the embodiment includes a comparator 132 and a pre-driver 134. The comparator 132 is coupled to the error amplifier 120 to receive the first voltage $V_1$; therein a triangle-wave or sawtooth-wave voltage signal $V_{tri}$ is compared with the first voltage $V_1$ to produce a comparison signal $V_{comp}$. The comparison signal $V_{comp}$ is then transmitted to the pre-driver 134 for being amplified as driving signals (a second voltage $V_2$ and a third voltage $V_3$ in this embodiment) for the following operation of PWM. The combination of the error amplifier 120, the comparator 132, and the pre-driver 134 in series is configured to generate the PWM driving signals, so that the voltage regulating apparatus 100 of the embodiment can also operate in the switching mode.

The selection unit 140 is provided for the voltage regulating apparatus 100 to select its operation either in the linear mode or in the switching mode. The selection unit 140 is coupled to the error amplifier 120 and the PWM unit 130, and outputs a fourth voltage $V_4$ being either the first voltage $V_1$ or the second voltage $V_2$ in accordance with the operation of the voltage regulating apparatus 100, either in the linear mode or in the switching mode. Here, the foregoing low-pass filters can also be configured in the voltage regulating apparatus 100, in correspondence with the operational mode thereof or the fourth voltage $V_4$ of the selection unit 140.

In another embodiment, the voltage regulating apparatus 100 can further include a control unit 170 so that it can be formed in a smart chip configuration. As shown in FIG. 1, the control unit 170 is coupled to the PWM unit 130, the selection unit 140, and the output stage 110. The control unit 170 can provide control signals for the PWM unit 130, the selection unit 140, and the output stage 110, respectively. The control unit 170 can realize the operational mode of the voltage regulating apparatus 100. If the voltage regulating apparatus 100 is in the linear mode, the control signals from the control unit 170 can cause the PWM unit 130 to be turned off, the fourth voltage $V_4$ of the selection unit 140 to be switched to the first voltage $V_1$, and the output stage 110 to choose the first capacitor as the low-pass filter so as to provide a predetermined output voltage for the voltage regulating apparatus 100 itself. On the other aspect, if the voltage regulating apparatus 100 is in the switching mode, the control signals from the control unit 170 can cause the PWM unit 130 to be turned on, the fourth voltage $V_4$ of the selection unit 140 to be switched to the second voltage $V_2$, and the output stage 110 to choose both the second capacitor and the inductor as the low-pass filter so as to provide another predetermined output voltage for the voltage regulating apparatus 100 itself.

In the embodiment, the power transistors include a P-type MOSFET (metal-oxide-semiconductor field-effect) transistor 150 and an N-type MOSFET transistor 160. The P-type MOSFET transistor 150, the error amplifier 120, and their corresponding output stage 110 can form a linear voltage regulator. Here, with regard to the P-type MOSFET transistor 150, its gate is connected to the fourth voltage $V_4$ of the selection unit 140, its source is connected to a DC voltage $V_{DD}$, and its drain is connected to the output stage 110. On the other aspect, the P-type MOSFET transistor 150 and the N-type MOSFET transistor 160 can form a CMOS (complementary metal-oxide-semiconductor) transistor, which can by combined with the error amplifier 120, the PWM unit 130, and their corresponding output stage 110 to form a switching voltage regulator. Here, more than the foregoing P-type MOSFET transistor 150, the N-type MOSFET transistor 160 has its gate connected to the PWM unit 130 to receive the third voltage $V_3$, its source connected to a ground, and its drain connected to the drain of the P-type MOSFET transistor 150 (and connected to the output stage 110, too).

Figure 2A:
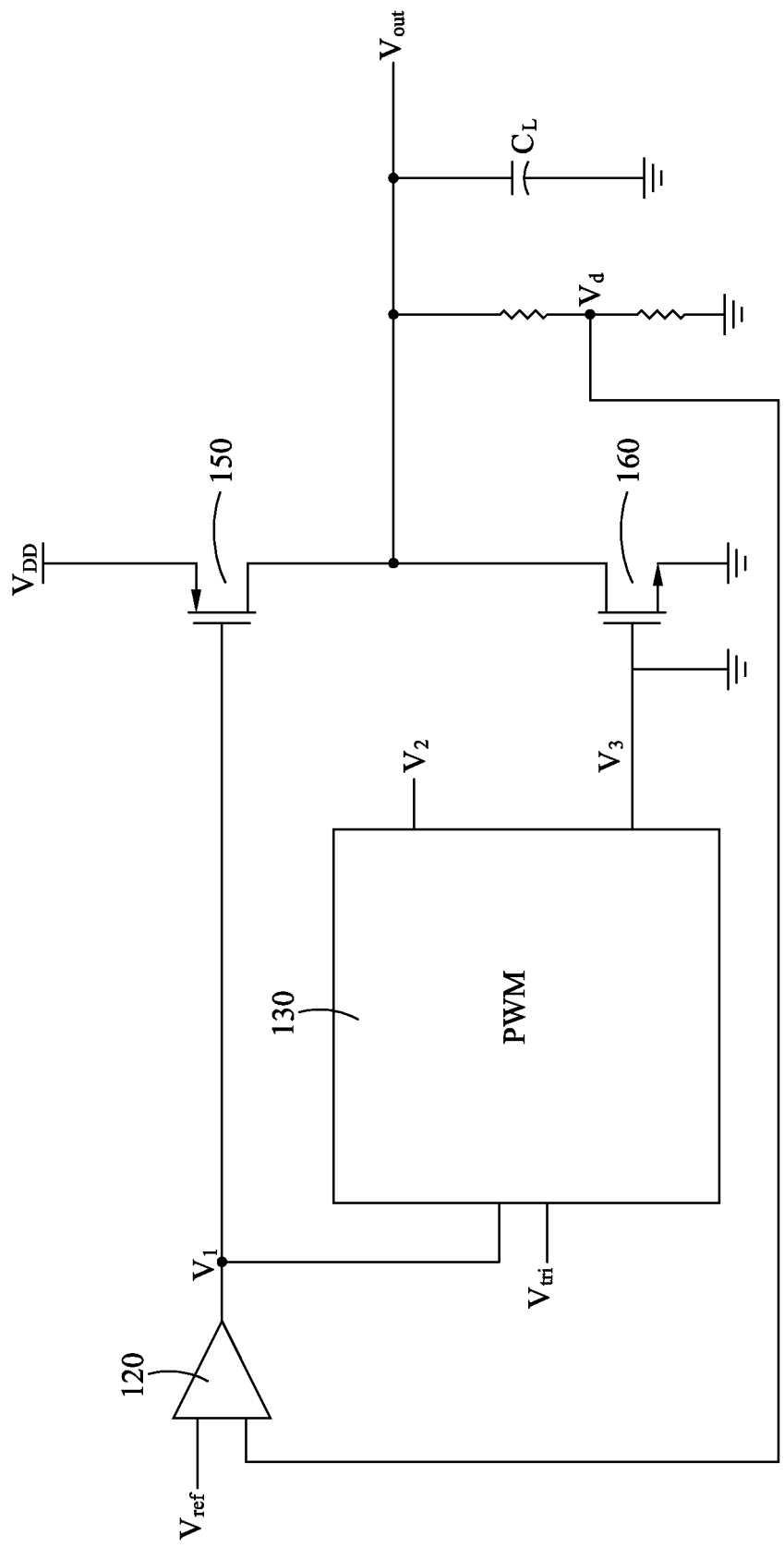
FIG. 2A is an equivalent circuit of the voltage regulating apparatus of FIG. 1 operating in the linear mode.
Figure 2B:
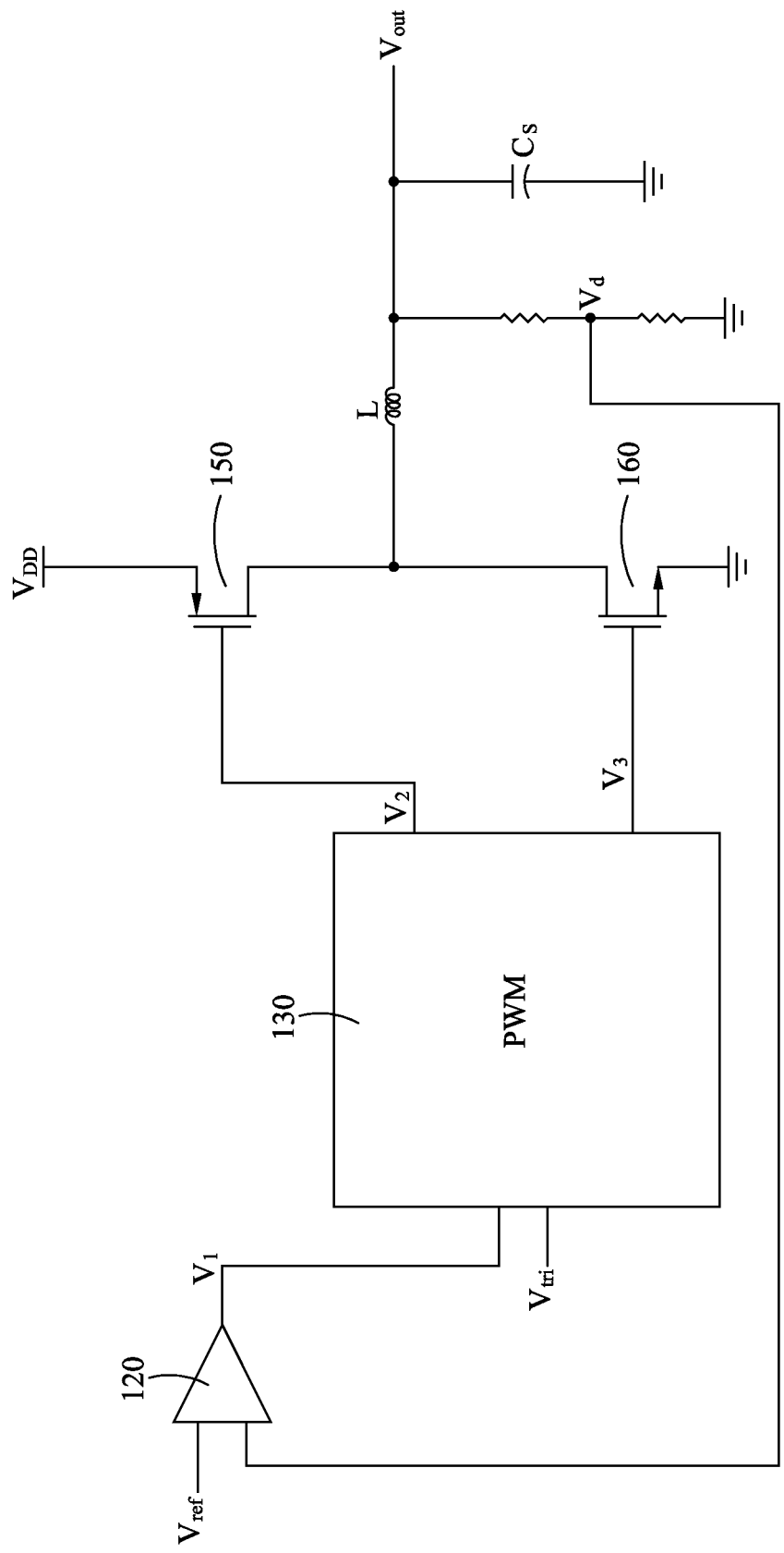
FIG. 2B is an equivalent circuit of the voltage regulating apparatus of FIG. 1 operating in the switching mode.

To implement the selection or switch between the operation of linear and switching modes, a switch $S_m$ is configured at the gate of the N-type MOSFET transistor 160 and is also controlled by the selection unit 140. If the voltage regulating apparatus 100 is put in the linear mode, the output voltage of the selection unit 140 can be the first voltage $V_1$ to cause the switch $S_m$ to ground the gate of the N-type MOSFET transistor 160; thus, the N-type MOSFET transistor 160 can be switched off. On the other hand, if the voltage regulating apparatus 100 is put in the switching mode, the output voltage of the selection unit 140 can be the second voltage $V_2$ to cause the switch $S_m$ to the gate of the N-type MOSFET transistor 160 connected to the PWM unit 130 to receive the third voltage $V_3$; thus, the N-type MOSFET transistor 160 can be switched on or off according to the third voltage $V_3$. The resultant circuits in accordance with both the foregoing conditions are re-illustrated in FIGS. 2A and 2B, respectively. As shown in FIGS. 2A and 2B, the embodiment is capable of providing a voltage regulating apparatus in which its linear mode of operation shares the output stage and the power transistors with its switching mode of operation. Wherein, a filtering capacitor $C_L$ of small capacitance can be used for the linear voltage regulators and $C_L$ has a capacitance of 1 μF in the example of FIG. 2A, while a filtering capacitor $C_S$ of large capacitance can be used for the switching voltage regulators, and $C_S$ has a capacitance of 22 µF and the inductor L has an inductance of 6.8 µH in the example of FIG. 2A. But it is not limited thereby, the capacitance and the inductance may depend on the practical requisite.

It should be noted that a linear voltage regulator usually provides a less output current, which is applicable to the usage of light load or no load, preferably to the light load. Instead, a switching voltage regulator usually provides a larger output current, which is applicable to the usage of heavy load. In the embodiment, although the P-type MOSFET transistor 150 is shared by the voltage regulating apparatus 100 of both the linear and switching modes, the requirements for operational currents of the P-type MOSFET transistor 150 in the two modes are different from each other. Consequently, the P-type MOSFET transistor 150 can be composed of a plurality of P-type transistors in parallel connection. In more detail, sources of the plurality of P-type transistors are connected to each other, gates of the plurality of P-type transistors are connected to each other, and drains of the plurality of P-type transistors are connected to each other. By the parallel connection of the plurality of P-type transistors, the operational current of the P-type MOSFET transistor 150 can be variable depending on the practical situations. Moreover, since the N-type MOSFET transistor 160 is connected in series to the P-type MOSFET transistor 150 including the plurality of P-type transistors in parallel and works only in the switching mode of operation, it may have a larger operational current.

Figure 3:
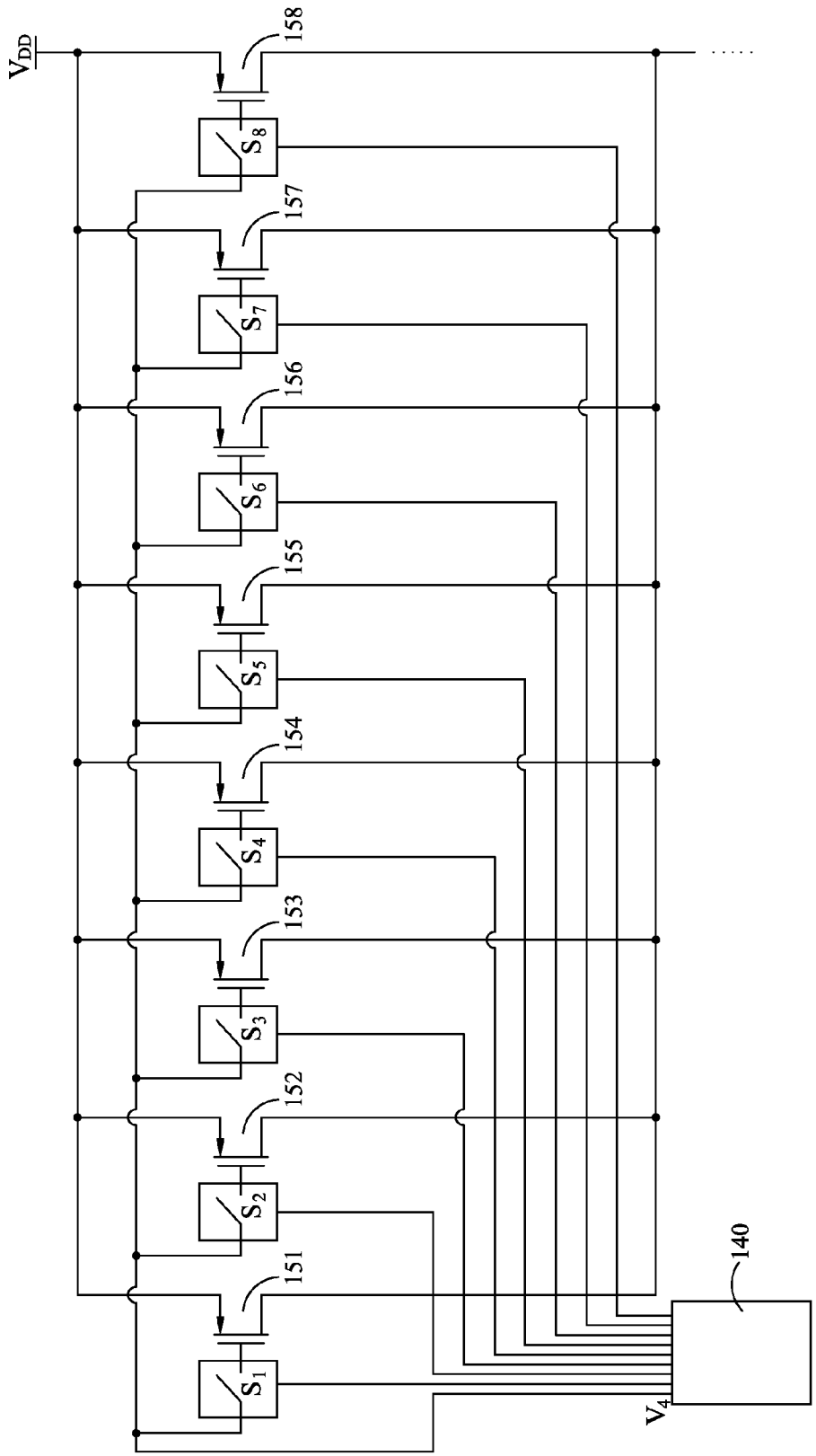
FIG. 3 is a circuit diagram of the P-type MOSFET transistor according to an exemplary embodiment, wherein the P-type MOSFET transistor is composed of eight P-type transistors.

For example, FIG. 3 illustrates a circuit diagram of the P-type MOSFET transistor according to an exemplary embodiment, wherein the P-type MOSFET transistor can be composed of eight P-type transistors 151 to 158, in which their gates are connected to switches $S_1$ to $S_8$, respectively. The selection unit 140 can further provide switch controlling signals to control operational states of the switches $S_1$ to $S_8$. Each switch $S_1$ to $S_8$ is coupled to the selection unit 140 to receive its respective switch controlling signal, which can be the fourth voltage $V_4$ to turn some of the switches on or be 0V to turn the other switches off. Whereby, a predetermined number of individual P-type transistors are in parallel connection to form the P-type MOSFET transistor 150, so as to provide an enough operational current for the output stage of the voltage regulating apparatus 100. For example, when the voltage regulating apparatus 100 operates in the linear mode, the selection unit 140 can be setup to turn the switches $S_1$ and $S_2$ on while to turn the switches $S_3$ to $S_8$ off, so as to get a less operational current in the P-type MOSFET transistor 150. On the other hand, when the voltage regulating apparatus 100 operates in the switching mode, the selection unit 140 can be setup to turn on all the switches $S_1$ to $S_8$, so as to get a larger operational current in the P-type MOSFET transistor 150. Thus, the P-type MOSFET transistor 150 of the voltage regulating apparatus 100 can be shared in both the linear and switching modes, and, concurrently, the discrepancy problem of the operational currents thereof between the two modes can be solved. But it is not limited thereby, the P-type MOSFET transistor 150 can be the other type of current-variable power transistor.

Figure 4:
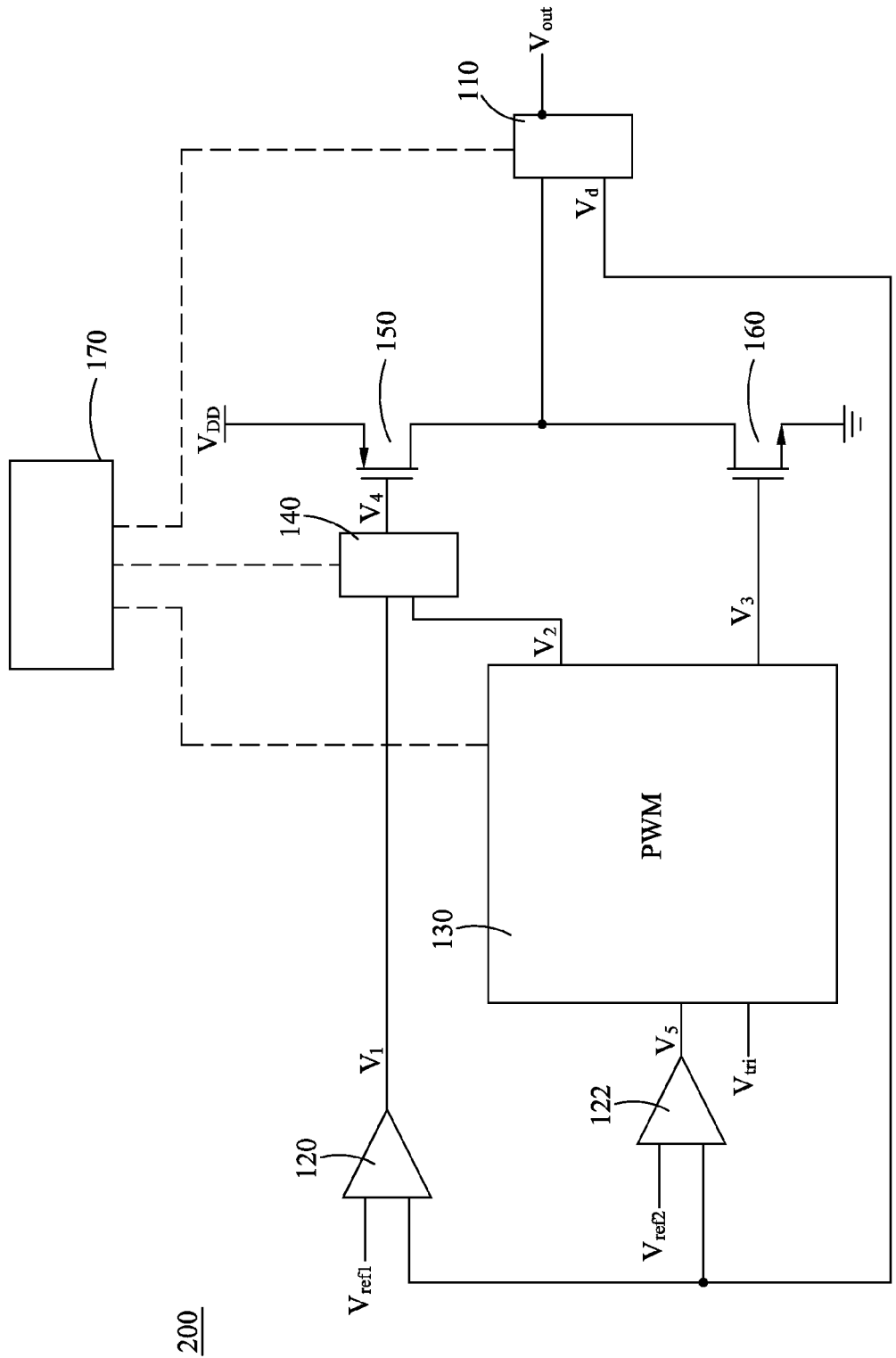
FIG. 4 is a circuit diagram illustrating a voltage regulating apparatus according to a second embodiment of the present invention.

In the foregoing first embodiment, the error amplifier 120 of the voltage regulating apparatus 100 is also shared between the linear and switching modes, but it is not limited thereby. Two error amplifiers can be configured in the voltage regulating apparatus, in which each error amplifier is designated to each operational mode. FIG. 4 shows a circuit diagram illustrating a voltage regulating apparatus according to a second embodiment of the present invention. The voltage regulating apparatus 200, which can operate either in a linear mode or in a switching mode, includes an output stage 110, a first error amplifier 120, a second error amplifier 122, a PWM unit 130, a selection unit 140, and at least two power transistors 150 and 160. As shown in FIG. 4, the first error amplifier 120, which is configured for the voltage regulation of linear mode, is coupled to the output stage 110 to receive the partial voltage $V_d$. Therein, the partial voltage $V_d$ is compared with a reference voltage $V_{ref1}$ to produce an error signal, and it is amplified and outputted as a first voltage $V_1$. Whereby, the voltage regulating apparatus 200 can operate in the linear mode. On the other aspect, the second error amplifier 122, which is configured for the voltage regulation of switching mode, is coupled to the output stage 110 to receive the partial voltage $V_d$. Therein, the partial voltage $V_d$ is compared with another reference voltage $V_{ref2}$ to produce another error signal, and it is amplified and outputted as a fifth voltage $V_5$. Whereby, the voltage regulating apparatus 200 can operate in the switching mode. The other parts and circuits of the voltage regulating apparatus 200 are identical to those in the first embodiment, with the same reference numbers. To avoid redundancy, please refer to the foregoing description.

With respect to the foregoing description, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. A voltage regulating apparatus, which can operate either in a linear mode or in a switching mode, the voltage regulating apparatus comprising:
    an output stage providing the voltage regulating apparatus with an output voltage and producing a partial voltage which is a fraction of the output voltage;
    an error amplifier coupled to the output stage and comparing the partial voltage with a reference voltage to produce a first voltage;
    a PWM unit coupled to the error amplifier and comparing the first voltage with a voltage signal to produce a second voltage and a third voltage;
    a selection unit coupled to the error amplifier and the PWM unit and outputting a fourth voltage which is equal to either the first voltage or the second voltage;
    a first power transistor coupled to the selection unit and receiving the fourth voltage and a DC voltage; and
    a second power transistor coupled to the PWM unit, the first power transistor, and a ground and receiving the third voltage;
    wherein a connection point of the first and second power transistors is coupled to the output stage.

2. The voltage regulating apparatus of claim 1, further comprising
    a control unit coupled to the PWM unit, the selection unit, and the output stage and outputting control signals to turn the PWM unit on or off, to switch the fourth voltage to be the first or second voltage, and to control the output voltage of the output stage, according to the operational mode of the voltage regulating apparatus.

3. The voltage regulating apparatus of claim 1, wherein the first power transistor has an operational current which is variable.

4. The voltage regulating apparatus of claim 1, wherein the first power transistor comprises a P-type MOSFET transistor in which its gate is connected to the fourth voltage, its source is connected to the DC voltage, and its drain is connected to the second power transistor.

5. The voltage regulating apparatus of claim 4, wherein the first power transistor is composed of a plurality of P-type MOSFET transistors connected in parallel.

6. The voltage regulating apparatus of claim 1, wherein the second power transistor comprises an N-type MOSFET transistor in which its gate is connected to the third voltage, its source is connected to the ground, and its drain is connected to the first power transistor.

7. The voltage regulating apparatus of claim 1, wherein the output stage comprises a voltage divider and a low-pass filter.

8. The voltage regulating apparatus of claim 7, wherein the low-pass filter comprises a capacitor.

9. The voltage regulating apparatus of claim 8, wherein the low-pass filter further comprises an inductor if the fourth voltage outputted by the selection unit is equal to the second voltage.

10. The voltage regulating apparatus of claim 7, wherein the low-pass filter comprises
  a first filter including a first capacitor; and
  a second filter including a second capacitor and an inductor.

11. A voltage regulating apparatus, which can operate either in a linear mode or in a switching mode, the voltage regulating apparatus comprising:
  an output stage providing the voltage regulating apparatus with an output voltage and producing a partial voltage which is a fraction of the output voltage;
  a first error amplifier coupled to the output stage and comparing the partial voltage with a first reference voltage to produce a first voltage;
  a second error amplifier coupled to the output stage and comparing the partial voltage with a second reference voltage to produce a second voltage;
  a PWM unit coupled to the second error amplifier and comparing the second voltage with a voltage signal to produce a third voltage and a fourth voltage;
  a selection unit coupled to the first error amplifier and the PWM unit and outputting a fifth voltage which is equal to either the first voltage or the third voltage;
  a first power transistor coupled to the selection unit and receiving the fifth voltage and a DC voltage; and
  a second power transistor coupled to the PWM unit, the first power transistor, and a ground and receiving the fourth voltage;
  wherein a connection point of the first and second power transistors is coupled to the output stage.

12. The voltage regulating apparatus of claim 11, further comprising
  a control unit coupled to the PWM unit, the selection unit, and the output stage and outputting control signals to turn the PWM unit on or off, to switch the fifth voltage to be the first or third voltage, and to control the output voltage of the output stage, according to the operational mode of the voltage regulating apparatus.

13. The voltage regulating apparatus of claim 11, wherein the first power transistor comprises a P-type MOSFET transistor in which its gate is connected to the fifth voltage, its source is connected to the DC voltage, and its drain is connected to the second power transistor.

14. The voltage regulating apparatus of claim 13, wherein the first power transistor is composed of a plurality of P-type MOSFET transistors connected in parallel.

15. The voltage regulating apparatus of claim 11, wherein the second power transistor comprises an N-type MOSFET transistor in which its gate is connected to the fourth voltage, its source is connected to the ground, and its drain is connected to the first power transistor.

16. The voltage regulating apparatus of claim 11, wherein the output stage comprises a voltage divider and a low-pass filter.

17. The voltage regulating apparatus of claim 16, wherein the low-pass filter comprises a capacitor.

18. The voltage regulating apparatus of claim 17, wherein the low-pass filter further comprises an inductor if the fifth voltage outputted by the selection unit is equal to the third voltage.

19. The voltage regulating apparatus of claim 16, wherein the low-pass filter comprises
  a first filter including a first capacitor; and
  a second filter including a second capacitor and an inductor.

* * * * *